United States Patent Office 3,332,974
Patented July 25, 1967

3,332,974
PURIFICATION OF CYCLIC ORGANOPOLYSILOXANES WITH HEAT-ACTIVATED METAL HYDRIDES
Edgar E. Bostick, Scotia, N.Y., assignor to General Electric Company, a corporation of New York
No Drawing. Filed Jan. 23, 1964, Ser. No. 339,593
9 Claims. (Cl. 260—448.2)

This invention is concerned with a process for removing impurities from cyclic organopolysiloxanes. More particularly, the invention relates to a process for purifying a cyclic organopolysiloxane to remove trace amounts of deleterious silanol compositions which undesirably interfere with the formation of high molecular weight products derived from said cyclic organopolysiloxane, which process comprises contacting the said cyclic organopolysiloxane with the silanol impurities therein (as well as other possible impurities) with a heat-activated metal hydride selected from the class consisting of calcium hydride, magnesium hydride and barium hydride, and thereafter separating the treated cyclic organopolysiloxane from the metal hydride.

One of the more prominent methods for making high molecular weight organopolysiloxanes, particularly organopolysiloxanes which are convertible to cured, solid, elastic products, comprises treating a cyclic organopolysiloxane with a condensing and rearranging agent which is able to open up the cyclic ring and effect linear condensation and polymerization to the higher molecular weight state. Among the materials which have been found especially effective for converting these cyclic organopolysiloxanes are compositions, for instance, alkali-metal hydroxides (e.g., potassium hydroxide, lithium hydroxide, cesium hydroxide, etc.); quaternary ammonium compounds (e.g., tetrabutyl ammonium hydroxide, tetrabutyl ammonium ethoxide, etc.); organophosphonium compounds (e.g., tetraethyl phosphonium hydroxide, tetrabutyl phosphonium hydroxide, tetraethyl phosphonium butoxide, etc.). These alkaline materials are incorporated in the cyclic organopolysiloxanes in small amounts, ranging from about 0.001 to about 0.5 percent, by weight, based on the weight of the cyclic organopolysiloxane. Thereafter, it is only necessary to heat the cyclic organopolysiloxane with the catalyst therein to effect polymerization and condensation to the higher molecular weight state, such as high molecular weight gums.

In order to attain a sufficiently high molecular weight product (e.g., molecular weights of from 500,000 to 2,000,000) with a minimum of reaction time, it is essential that the cyclic organopolysiloxane employed in the reaction be as pure as possible. It has been found that the impurities which offer the greatest obstacle to attainment of sufficiently high molecular weight states through the polymerization and condensation reaction are compositions in the cyclic polysiloxane which contain silanol (—SiOH) groups, as well as by-products derived from the formation of the cyclic organopolysiloxanes. These by-products (which contain active hydrogen) include acids, alcohols, trace amounts of water and the hydrolyzable silane.

The above impurities (which can be trace amounts of less than 0.001%, by weight, of the cyclic polysiloxane) are derived as a result of using the starting organohydrolyzable silane (or mixture of silanes) employed to make the cyclic polysiloxanes. Thus, in making these cyclic organopolysiloxanes, organosilanes of the formula $$RRSiX_2$$

where R is a monovalent hydrocarbon radical and X is a hydrolyzable group, are treated with water to effect cyclicization of the starting intermediate and the formation of siloxane linkages. Among the hydrocarbon radicals which R can be are, for instance, alkyl radicals (e.g., methyl, ethyl, propyl, isopropyl, butyl, amyl, etc.); aryl radicals (e.g., phenyl, biphenyl, naphthyl, etc.); aralkyl radicals (e.g., benzyl, phenylethyl, etc.); alkaryl radicals (e.g., toyl, xylyl, ethylphenyl, etc.); alkenyl radicals (e.g., vinyl, allyl, methallyl, etc.); as well as halogenated, for example, chlorinated, hydrocarbon radicals (e.g., monochlorophenyl, dichlorophenyl, etc.). It will of course be understood that R in the starting hydrolyzable silane can be the same or different organic groups. Among the values which X may be are, for instance, halogen (e.g., chlorine, bromine, fluorine, etc.); acyloxy (e.g., acetoxy, propionoxy, etc.); organoxy (e.g., methoxy, ethoxy, isopropoxy, phenoxy, etc.).

It will be apparent that when the aforesaid hydrolyzable silane (or mixture of such silanes) is treated with water to form the cyclic organopolysiloxanes, there will be present in the reaction mixture residues derived from the hydrolysis such as low moleculr weight organosilanols as, for instance, those having the formula I 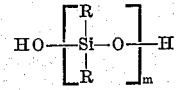

where R has the meaning given above and $m$ has a value from 2 to 10 or more; acids such as hydrochloric acid, hydrobromic acid, acetic acid, propionic acid, etc.; or alcohols, such as methanol, ethanol, isopropanol, etc. In order that the cyclic organopolysiloxane formed from the hydrolysis may be converted to linear organopolysiloxanes of the more desirable high molecular weight ranges, it is important, as pointed out previously, that these low molecular weight silanol-containing compounds, as well as any present alcohols and acids should be removed so that the amount of impurity is much less than the catalyst (i.e., the rearrangement and condensation catalyst) concentration in order that the catalyst may not be either reduced in concentration or even used up, since the catalyst is necessary to act as a terminal on a growing chain to build higher molecular weight products. Preferably, the cyclic polysiloxane should be substantially completely free of the aforesaid impurities for optimum molecular weight attainment. The problem of silanol contamination becomes more acute if there is present in the hydrolyzed product a silanol-containing residue derived from a trifunctional organosilane, e.g., $CH_3Si(Q)_3$ where Q is a hydrolyzable group such as X above or a hydroxy group.

It is therefore the primary object of this invention to remove impurities from cyclic organopolysiloxanes which may deleteriously affect further polymerization and condensation of such cyclic organopolysiloxanes.

It is a still further object of the invention to obtain pure cyclic organopolysiloxanes substantially free of positive trace amounts (e.g., less than 0.5% and preferably below 0.001% by weight) of impurities such as silanol-containing compounds, acids and alcohols.

It is another object of the invention to be able to polymerize cyclic organopolysiloxanes to high molecular weight products in relatively short periods of time to intrinsic viscosities which are more readily attained because of the absence of impurities which tend to impede the attainment of such intrinsic viscosities.

Other objects of the present invention will become more apparent from the discussion which follows.

The cyclic organopolysiloxanes with which the present invention is concerned may be considered as having the formula II 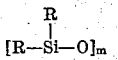

where R has the meaning given above and $m$ is a whole number from 3 to 12. As pointed out above, these cyclic organopolysiloxanes are prepared by the hydrolysis of diorganodihydrolyzable silanes of the formula

(where R and X have the meaning given above) with water and thereafter isolation by usual means of distillation and crystallization. Despite careful working up of the desired product, trace impurities of the types recited above are present unless extra precautions are observed by means of extensive and excessive processing and purification techniques resulting in increased expense of operation.

The term "heat-activated metal hydride," for instance, "heat-activated calcium hydride" is intended to mean a metal hydride, for instance, calcium hydride, which has been heated under vacuum of below 50 microns pressure at a temperature of from 300 to below 600° C. for times advantageously, although not limited thereto, of from about 20 to 60 minutes or more, until essentially all surface moisture is removed from the metal hydride, and any contamination thereof with hydroxyl groups is avoided, and until bound hydrogen on the calcium hydride is substantially completely reduced to the equilibrium composition under the conditions mentioned above. Once the heat-activated metal hydride is obtained, precautions must be taken that it does not again become contaminated by those materials which have been removed during the heat-activation. This can be accomplished by maintaining the heat-activated metal hydride under an inert atmosphere such as under nitrogen or argon, under substantially anhydrous conditions until such time as the cyclic organopolysiloxane is allowed to contact the metal hydride for its intended removal of the impurities from the cylic organopolysiloxane.

Although it is not clearly understood why the heat-activated metal hydride is effective in the practice of my invention, nevertheless it is believed that the heat treatment under the conditions recited above causes the formation of a non-stoichiometric metal hydride which, as illustrated with calcium hydride, is believed to have the possible molecular structures $CaH_2 \cdot CaH$ and $CaH_2 \cdot Ca_2$.

The unexpected ability to enhance the attainment of high molecular weight products from cyclic organopolysiloxanes treated with the activated metal hydride is illustrated by the fact that when non-heat activated metal hydrides, such as non-heat activated calcium hydride, are used in place of the heat-activated metal hydride, one obtains molecular weights (as evidenced by intrinsic viscosity) which are substantially lower than those attainable by treating the cyclic organopolysiloxane under otherwise equivalent conditions with the heat-activated metal hydride prior to polymerization and condensation of the cyclic organopolysiloxane. The heat-activated metal hydrides are especially suitable because they are capable of combining with the trace impurities to form inert substances. They are unreactive towards and insoluble in the system being purified, and the metal hydride is easily activated and used in small quantities at a reasonable temperature.

The methods whereby the heat-activated metal hydride is formed and the latter used for removal of impurities from cyclic organopolysiloxane can be varied widely. One method which I have found particularly suitable is to effect the heat-activation of the metal hydride in close proximity to the cyclic organopolysiloxane which is to be purified. This can be done by using an apparatus in which the metal hydride can be radily subjected to a vacuum and to heating, for instance, by applying a flame to the outside of the apparatus containing the metal hydride while a vacuum is applied, so that any product resulting from the heating of the metal hydride can be readily removed. The apparatus can thus be so constructed that the chamber in which the heat-activation of the metal hydride occurs is in close proximity to a chamber containing the cyclic organopolysiloxane which is to be purified.

After heat-activation of the metal hydride, by use of valves or similar means, the cyclic organopolysiloxane is allowed to enter the chamber of the heat-activated metal hydride while insuring that extraneous moisture is excluded from the heat-activated metal hydride and from the zone in which the cyclic organopolysiloxane is undergoing purification. The heated activation chamber is advantageously a metal or Pyrex glass column, which can be packed with the metal hydride which advantageously has an average particle size of from 10–100 mesh (according to the U.S. Sieve Series). If the metal hydride is too fine, it becomes difficult to put through the cyclic organopolysiloxane. If the metal hydride is too coarse, then insufficient surface area is afforded for contact with the cyclic organopolysiloxane. Optimum particle size in many purifications has been found to be in the range of from about 20 to 60 mesh.

The metal hydride is advantageously packed into a Pyrex glass column supported by a glass frit and further supported by some porous inert material such as glass wool. Attached to the column is a means for evacuating the latter to remove volatile products as the metal hydride is heated. To the upper portion of the column can be attached a reservoir in which is contained the cyclic organopolysiloxane. If the cyclic organopolysiloxane is a liquid, it is no problem to flow the cyclic organopolysiloxane through the heat-activated metal hydride. However, if the cyclic organopolysiloxane is a solid, which is often the case, the latter can be dissolved in a suitable solvent such as hexane or benzene and the solution then allowed to pass over the heat-activated metal hydride and the purified product recovered. Removal of the solvent leaves behind the purified cyclic organopolysiloxane.

The amount of metal hydride used with the cyclic organopolysiloxane undergoing purification can be varied widely. I have found that amounts as small as 0.1 to 2 parts, by weight, of the heat-activated metal hydride per 100 parts of cyclic organopolysiloxane can effectively cause reduction in the level of the impurities in the cyclic organopolysiloxane. As the amount of the heat-activated metal hydride increases in proportion to the weight amount of the cyclic organopolysiloxane, there is greater insurance that essentially all of the impurities present in the heat-activated metal hydride will be removed. Generally, it is unnecessary to use excessive amounts and at most, a weight ratio of 1 part of the heat-activated metal hydride to 1 part of the cyclic organopolysiloxane undergoing purification is needed, although larger proportions of the metal hydride can be used. Persons skilled in the art will have no difficulty in determining the optimum relative amounts of the heat-activated metal hydride and the cyclic organopolysiloxane. Furthermore, it is possible to reheat the metal hydride and reactivate the spent purifying agent, and use it again for purification purposes.

The intrinsic viscosity referred to above (identified by the symbol "/η/" or "η") and in the examples is a measurement of the molecular weight of the polymers formed from polymerization and condensation with agents for that purpose and was determined as follows. The viscometer used was a modified Ubbelohde viscometer in which in place of the straight capillary tube between the second bulb and the reservoir, a coil of two turns of capillary tubing was substituted. The dimensions of the capillaries were (a) 2 mm. diameter between first and second bulbs and (b) 0.5 mm. diameter for coiled capillary (inside diameter of coils about 1"). The intrinsic viscosity was carried out in a constant temperature water bath maintained at about 25° C.

The actual determination of the intrinsic viscosity involved drying of 0.1 gram of the polymer whose intrinsic viscosity was to be determined, in vacuum at 110°

C. for three hours and then weighing the sample. A volume (in milliliters) of reagent grade benzene was added equal to the weight of the polymer (in grams) multiplied by 100. When all the polymer had dissolved, a small test tube was filled with the solution, corked and centrifuged to settle out any foreign matter that might be present. A 5 ml. aliquot was removed from the test tube and transferred to the viscometer placed in a 25° C. constant temperature water bath. The bulbs of the viscometer were filled with the solution and the time in seconds for the solution to fall from the first to the second graduation was recorded. Several dilutions were made by adding known volumes of benzene to the reservoir bulb, mixing thoroughly, and then repeating the procedure. The number of seconds required for the solvent to pass through the first and second graduations was checked periodically. The intrinsic viscosity was determined by plotting the specific viscosity divided by the concentration against the concentration in grams of polymer per hundred ml. of benzene and extrapolating the curve to C (concentration) equal to 0. The following are the formulas which were used in determining the intrinsic viscosity:

$$\eta \text{ relative} = \frac{\text{number of seconds for solution}}{\text{number of seconds for solvent}}$$

$$\eta \text{ specific} = \eta \text{ relative} - 1$$

$$\eta = \frac{\text{specific}}{C} = \frac{\eta \text{ specific}}{\text{grams polymer per 100 ml. solvent}}$$

$$|\eta|(\text{intrinsic}) = \frac{\eta \text{ specific}}{C} \text{ as } C \rightarrow 0$$

In order that those skilled in the art may better understand how the present invention may be practiced, the following examples are given by way of illustration and not by way of limitation. All parts are by weight unless otherwise stated.

*Example 1*

Hexamethylcyclotrisiloxane (obtained by hydrolyzing dimethyldichlorosilane and which even after purification contained trace amounts of at least about 0.001 to 0.01%, by weight, of low molecular weight silanols, such as tetramethyldisiloxanediol, and hexamethyltrisiloxanediol) was mixed in approximately equal parts by weight with 40 mesh calcium hydride to remove atmospheric water. A glass vessel containing this mixture was attached to a Pyrex glass column packed with two 2-inch zones of 40 mesh calcium hydride. This total assembly was then sealed to a Pyrex glass manifold containing six ampoules having breakable seals. The entire apparatus was fitted to a vacuum line and pumped to about $10^{-15}$ mm. Hg pressure. During this time, the hexamethylcyclotrisiloxane was frozen in nitrogen in order to avoid removal of the volatile cyclotrisiloxane during the room temperature evacuation. This evacuation also removed some of the trace amounts of water which were present in the hexamethylcyclotrisiloxane. Thereafter, while still maintaining the vacuum, the assembly, i.e., the manifold and the column were subjected to heating with a flame for about 20 to 30 minutes in such a fashion that a temperature of the order of about 400–500° C. was applied throughout the zone of the manifold and column. The glass temperature was maintained high enough to cause visible sodium emission and to cause hydrogen gas evolution from the $CaH_2$. After cooling the column, a vacuum of $10^{-5}$ mm. pressure was applied so as to sublime the hexamethylcyclotrisiloxane through the column to the ampoules which were then sealed off under the same reduced pressure. The effect of treating the hexamethylcyclotrisiloxane with the heat-activated calcium hydride was determined by subjecting a sample of the treated cyclic polymer to polymerization and condensation conditions by heating the latter with about 0.001 percent, by weight, thereof KOH for about 40 minutes. Thereafter, the intrinsic viscosity (described above) was determined for this polymer and compared with the intrinsic viscosity of a polymer obtained under essentially the same conditions of polymerization of the hexamethylcyclotrisiloxane with KOH, but omitting the treatment with the heat-activated calcium hydride. This comparison showed that whereas the polymer made with the cyclic polysiloxane having the heat-activated calcium hydride treatment had an intrinsic viscosity $/\eta/$ 5.3 dl./g. (molecular weight about 5,000,000), the polymer made with the hexamethylcyclotrisiloxane from which the treatment with the heat-activated calcium hydride was omitted, had an intrinsic viscosity $/\eta/$ 1.30 dl./g. (molecular weight about 500,000).

*Example 2*

When magnesium hydride and barium hydride are heat-activated and substituted for the heat-activated calcium hydride in Example 1, and otherwise the hexamethylcyclotrisiloxane is treated in the manner as described in Example 1 and polymerized by means of the potassium hydroxide, similar improvements in molecular weight of the polymer (as evidenced by improved values of intrinsic viscosity) are obtained as contrasted to the lower intrinsic viscosity of polymers derived from polymerization with KOH of the hexamethylcyclotrisiloxane which had not been treated with the heat-activated magnesium hydride or heat-activated barium hydride.

*Example 3*

The compound [1] trans-2,4,6-triphenyl-2,4,6-trimethylcyclotrisiloxane was prepared by hydrolyzing methyl phenyldichlorosilane dissolved in acetone with sodium bicarbonate and thereafter isolating the desired reaction product. This composition, which is a white, crystalline material melting at about 45° C., was known to contain trace amounts (somewhat less than 0.2 weight percent) of silanol-containing compounds even though subjected to several recrystallizations. About 5 grams of this methyl phenyl cyclotrisiloxane dissolved in 30 ml. anhydrous degassed benzene was placed in an ampoule, and the latter sealed to a ½ inch Pyrex glass column containing a 3-inch packing (about 2 grams) of around 40 mesh calcium hydride supported by 2 inches of Pyrex wool and a fritted Pyrex filter. The bottom of this column terminated in a 100 ml. reaction bulb having a rubber enclosure to which n-butyl lithium could be injected. The n-butyl lithium served as the polymerization and condensation catalyst similarly as the KOH did in the preceding examples. The reaction assembly was evacuated to 0.01 micron Hg pressure and thereafter a flame was applied similarly as was done in Example 1 until gas evolution from the calcium hydride was evident and finally such gas evolution slowed down. Thereafter, the solution of the cyclotrisiloxane in benzene was allowed to pass over the heat-activated calcium hydride (at room temperature of about 25–27° C.). After the entire solution had passed over the heat-activated calcium hydride, benzene was flash removed from the treated cyclotrisiloxane, and a vacuum line was then attached and all residual traces of benzene were removed by means of the vacuum at room temperature. The vacuum was broken with nitrogen and about 4 mg. of the n-butyl lithium catalyst (as a 12.5 percent, by weight, solution of n-butyl lithium in hexane) was added to the cyclotrisiloxane. The vacuum was reestablished and the reaction chamber sealed off,

---

[1] The compound is identified with the oxygen as the number one heterocyclic atom.

in order to avoid any contamination of the reactants with moisture. Polymerization was conducted by heating the mixture of the treated cyclotrisiloxane and the n-butyl lithium catalyst for 12 hours at 150° C. The reaction mixture was then opened and a benzene-acetic acid mixture was added to terminate the reaction and dissolve the polymer. The polymer solution was filtered, dried on a rotating evaporator and thereafter extracted with hexane to remove any unreacted compositions. The residual product was then dried in a vacuum (12.5 mm. Hg) desiccator at 100° C. for about 18 hours. The above polymerization was carried out again with the same ingredients and under the same conditions with the exception that the cyclotrisiloxane was not treated with heat-activated calcium hydride prior to polymerization. After the final drying in the vacuum desiccator at 100° C., each of the two products was then evaluated for intrinsic viscosity. It was found that the polymer derived from the cyclotrisiloxane which had been treated with the heat-activated calcium hydride had an intrinsic viscosity of /η/ 1.01 dl./g. (molecular weight about 500,000 to 600,000) while the intrinsic viscosity /η/ of the polymer derived from the cyclotrisiloxane which had not been treated with the heat-activated calcium hydride was 0.63 dl./g. (molecular weight about 200,000 to 300,000).

Example 4

In this example, 10 grams of 2-methyl-2-ethyl-4,4,6,6-tetraphenylcyclotrisiloxane having a melting point of 75–76° C. and recrystallized once from an equal volume mixture of hexane and isopropanol (the preparation of which is disclosed in Example 4 of the copending application of Christian R. Sporck, Ser. No. 240,440, filed Nov. 27, 1962, now abandoned, and assigned to the same assignee as the present invention), was dissolved in 50 ml. hexane. The cyclic polysiloxane had impurities therein of silanol-containing compounds of below 0.1 weight percent; this solution was passed through a column of heat-activated calcium hydride packed in a tube 15 cm. long and 0.7 cm. in diameter over a period of 90 minutes, the column of calcium hydride having been previously heated at a temperature of from 400–500° C. under the conditions described in Example 1 above. Thereafter, the cyclic polymer was polymerized similarly as in Example 1 with the exception that 0.004 percent, by weight, potassium naphthalene was employed in place of the KOH for the polymerization reaction. The intrinsic viscosity of this latter product as well as the intrinsic viscosity of a polymer prepared from the same cyclic polysiloxane which had not been treated with the heat-activated calcium hydride were determined. It was found that the intrinsic viscosity of the polymer made from the cyclic polysiloxane treated with the heat-activated calcium hydride had an intrinsic viscosity /η/ of 2.4 dl./g., whereas the polymer obtained from the cyclic polysiloxane which had not been treated with the calcium hydride had an intrinsic viscosity /η/ of 1.6 dl./g.

Example 5

This example illustrates the effect of prolonging the contact time of the cyclic organopolysiloxane with the heat-activated calcium hydride. More particularly, 0.8 part heat-activated calcium hydride was mixed with 1 part of 2-methyl-2-ethyl-4,4,6,6-tetraphenylcyclotrisiloxane described above (containing small amounts of silanol-containing compounds) and contact was maintained between the ingredients at room temperature (about 25–27° C.) for times ranging from 0.5 to 2 hours. At the end of each contact time, the cyclic polysiloxane was removed and polymerized with a small amount of potassium naphthalene in the manner recited in the previous example, using the same conditions of polymerization. Concurrently, an identical sample of the cyclic polysiloxane was maintained for the same lengths of time with non-activated calcium hydride at 25–27° C., and again the cyclic polysiloxane was polymerized similarly as above. The intrinsic viscosities of the polymers so obtained were determined. The following Table I shows the intrinsic viscosities after different times of contact of the polymers under the foregoing conditions.

TABLE I

| Conditions Contact Time (Hours) | Intrinsic Viscosity of Product Treated with Heat-Activated CaH$_2$ | Intrinsic Viscosity of Product Treated with Non-Heat-Activated CaH$_2$ |
|---|---|---|
| 0.5 | 4.6 | 3.1 |
| 1.0 | 4.7 | 3.3 |
| 2.0 | 5.2 | 4.1 |

Example 6

In this example, 2,2-dimethyl-4,4,6,6-tetraphenylcyclotrisiloxane (which composition is disclosed and claimed in the aforesaid Sporck application, Ser. No. 240,440), was obtained by reacting tetraphenyldisiloxanediol-1,3 dissolved in diethyl ether with dimethyldichlorosilane dissolved in diethyl ether and pyridine. After isolating the solid material from the reaction mixture, the product was distilled and then recrystallized once from an equal volume mixture of ethanol and hexane to give a crystalline product which, without further purification, melted at 88° C. This cyclic polymer was heated at 127° C. for about 4.4 hours with 0.004%, KSi(C$_6$H$_5$)$_3$ [the preparation of which is disclosed in J. Org. Chem., 18, No. 6, 753 (1953)] based on the weight of the cyclic polymer. At the end of this time, an organopolysiloxane linear polymer was obtained having an intrinsic viscosity /η/ of 1.50 dl./g. In contrast to this, when the same polymer distilled and recrystallized once as above was allowed to percolate through heat-activated calcium hydride prepared in essentially the same manner as previously described, and thereafter the treated cyclic polymer was heated similarly as above at a temperature of about 125° C. for about 4.2 hours with the same amount of triphenyl silyl potassium, a polymer was obtained which had an intrinsic viscosity /η/ of 4.2 dl./g. This established quite clearly that the usual purification such as distillation and recrystallization of the initial cyclic polysiloxane left in the cyclic polysiloxane impurities such as the aforesaid silanol-containing compounds and active hydrogen compounds (such as water, HCl, etc.), which interfered with the attainment of higher intrinsic viscosity polymers and accordingly higher molecular weight polymers.

It will of course be apparent to those skilled in the art that in addition to the conditions employed above in making the heat-activated metal hydride and the proportions of the heat-activated metal hydride to the cyclic organopolysiloxane, other procedures, proportions, etc., may be employed without departing from the scope of the invention. In place of the cyclic organopolysiloxanes recited in the foregoing examples, other cyclic organopolysiloxanes containing trace amounts of the impurities previously recited, many of which are exemplified by the Formula II recited previously, may be employed. Among such cyclic polysiloxanes may be mentioned, for instance, hexaphenyl cyclotrisiloxane, hexaethyl cyclotrisiloxane, octamethylcyclotetrasiloxane, octaphenylcyclotetrasiloxane, vinyl heptamethylcyclotetrasiloxane, decamethylcyclopentasiloxane; 2,2 - (bis-chlorophenyl)-4,4,6,6-tetraphenylcyclotrisiloxane, the preparation of which is disclosed in the application of Christian R. Sporck, Ser. No. 160,265 filed Dec. 18, 1961, and assigned to General Electric Company; 2,2 - dimethyl-4,4,6,6,8,8-hexaphenylcyclotetrasiloxane (disclosed in the above Sporck application Ser. No. 240,440); triphenylsiloxy pentaphenylcyclosiloxane and triphenylsiloxy heptaphenylcyclotetraphenyl siloxane of the formula

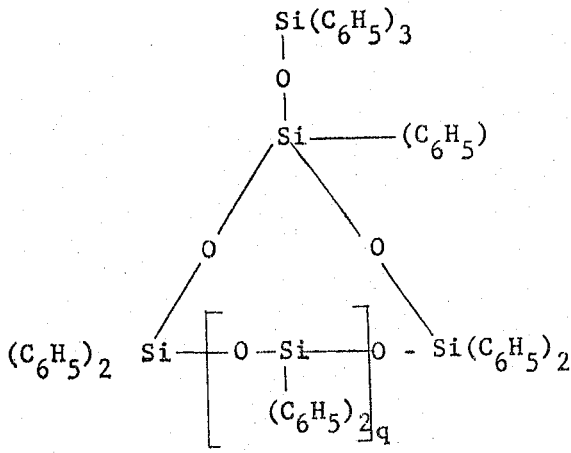

where $q$ is a whole number equal to from 0 to 1, inclusive, more particularly disclosed and claimed in the copending application of Christian R. Sporck, Ser. No. 160,263, filed Dec. 18, 1961, and assigned to the same assignee as the present invention; 2,2-dimethyl-4,4,6,6,8,8-hexaphenylcyclotetrasiloxane, etc.

It is intended that the use of the heat-activated metal hydride can be employed in conjunction with any cyclic organopolysiloxane which contains therein impurities of the kind previously recited. It has additionally been found that by using the heat-activated metal hydride to remove silanol impurities (as well as other impurities recited above) from cyclic organopolysiloxanes, high molecular weight organopolysiloxanes derived from such cyclic compositions are obtained in shorter periods of time than can be realized by polymerizing and condensing cyclic organopolysiloxanes from which the treatment with the heat-activated metal hydride is omitted. Concurrently, because of the removal of the aforesaid impurities, smaller quantities of condensation and polymerization agents are required for preparing the higher molecular weight product therefrom. By being able to use smaller quantities of these catalysts, it is easier to remove such catalysts (if such catalyst removal is necessary), and if the catalyst is allowed to remain in the finally polymerized product, it will have less harmful effect on the properties of the latter.

Purified cyclic organopolysiloxanes obtained in accordance with the present process can be used to make polymers which can be cured advantageously in the presence of fillers to the infusible, insoluble state by means of various curing agents such as organic peroxides (e.g., benzoyl peroxide, tertiary butyl benzoate, etc.) to make useful molded, heat-resistant products. In particular these heat resistant products can be employed as insulation for electrical conductors and for other applications where flexibility for extended periods of time at elevated temperatures is a criterion.

What I claim as new and desire to secure by Letters Patent of the United States is:

1. The process for treating a cyclic organopolysiloxane having a silanol-containing compound therein as an impurity which deleteriously affects the polymerization activity of the cyclic polysiloxane, which process comprises contacting the aforesaid cyclic organopolysiloxane with a heat-activated metal hydride selected from the class consisting of calcium hydride, magnesium hydride and barium hydride, and thereafter separating the treated cyclic organopolysiloxane from said metal hydride.

2. The process which comprises contacting a cyclic hydrocarbon-substituted polysiloxane having present therein an impurity composed of a silanol-containing compound with a heat-activated calcium hydride to remove substantially all of the silanol-containing compound, separating the treated cyclic polysiloxane from the calcium hydride, and thereafter polymerizing the cyclic polysiloxane to a higher molecular weight product.

3. The process which comprises contacting a cyclic hydrocarbon-substituted polysiloxane having present therein an impurity composed of a silanol-containing compound with a heat-activiated magnesium hydride to remove substantially all of the silanol-containing compound, separating the treated cyclic polysiloxane from the magnesium hydride, and thereafter polymerizing the cyclic polysiloxane to a higher molecular weight product.

4. The process which comprises contacting a cyclic hydrocarbon-substituted polysiloxane having present therein an impurity composed of a silanol-containing compound with a heat-activated barium hydride to remove substantially all of the silanol-containing compound, separating the treated cyclic polysiloxane from the barium hydride, and thereafter polymerizing the cyclic polysiloxane to a higher molecular weight product.

5. The process which comprises treating hexamethylcyclotrisiloxane containing as an impurity therein a silanol-containing compound, which process comprises contacting the said cyclic polysiloxane with a heat-activated calcium hydride to remove essentially all of the silanol-containing compound, and thereafter isolating the treated cyclic polysiloxane from the calcium hydride.

6. The process which comprises treating 2,4,6-triphenyl-2,4,6-trimethylcyclotrisiloxane containing as an impurity therein a silanol-containing compound, which process comprises contacting the said cyclic polysiloxane with a heat-activated calcium hydride to remove essentially all of the silanol-containing compound, and thereafter isolating the treated cyclic polysiloxane from the calcium hydride.

7. The process which comprises treating 2-methyl-2-ethyl-4,4,6,6-tetraphenylcyclotrisiloxane, containing as an impurity therein a silanol-containing compound, which process comprises contacting the said cyclic polysiloxane with a heat-activated calcium hydride to remove essentially all of the silanol-containing compound, and thereafter isolating the treated cyclic polysiloxane from the calcium hydride.

8. The process which comprises treating 2,2-dimethyl-4,4,6,6-tetraphenylcyclotrisiloxane containing as an impurity therein a silanol-containing compound, which process comprises contacting the said cyclic polysiloxane with a heat-activated calcium hydride to remove essentially all of the silanol-containing compound, and thereafter isolating the treated cyclic polysiloxane from the calcium hydride.

9. The process which comprises treating hexamethylcyclotrisiloxane containing as an impurity therein a silanol-containing compound, which process comprises contacting the said cyclic polysiloxane with a heat-activated magnesium hydride to remove essentially all of the silanol-containing compound, and thereafter isolating the treated cyclic polysiloxane from the magnesium hydride.

References Cited

UNITED STATES PATENTS 2,884,333 4/1959 Smith _____ 260—448.2
2,884,334 4/1959 Smith _____ 260—448.2

TOBIAS E. LEVOW, *Primary Examiner.*

P. F. SHAVER, *Assistant Examiner.*